US008601181B2

(12) United States Patent  
Miura et al.

(10) Patent No.: US 8,601,181 B2
(45) Date of Patent: Dec. 3, 2013

(54) SYSTEM AND METHOD FOR READ DATA BUFFERING WHEREIN AN ARBITRATION POLICY DETERMINES WHETHER INTERNAL OR EXTERNAL BUFFERS ARE GIVEN PREFERENCE

(75) Inventors: Seiji Miura, Tokyo (JP); Roger Dwain Isaac, Campbell, CA (US)

(73) Assignee: Spansion LLC, Sunnyvale, CA (US)

( * ) Notice: Subject to any disclaimer, the term of this patent is extended or adjusted under 35 U.S.C. 154(b) by 238 days.

(21) Appl. No.: 12/276,116

(22) Filed: Nov. 21, 2008

(65) Prior Publication Data

US 2009/0138632 A1    May 28, 2009

Related U.S. Application Data

(60) Provisional application No. 61/004,361, filed on Nov. 26, 2007, provisional application No. 61/004,434, filed on Nov. 26, 2007, provisional application No. 61/004,362, filed on Nov. 26, 2007, provisional application No. 61/004,412, filed on Nov. 26, 2007.

(51) Int. Cl.
*G06F 13/00* (2006.01)
*G06F 3/00* (2006.01)

(52) U.S. Cl.
USPC .......... 710/52; 710/8; 710/9; 710/10; 710/53; 710/54; 710/58; 711/118; 711/167; 713/500

(58) Field of Classification Search
USPC .............. 710/8–10, 52–54, 58; 711/158, 167, 711/113, 118, 115; 713/500
See application file for complete search history.

(56) References Cited

U.S. PATENT DOCUMENTS

| 6,564,291 | B1 * | 5/2003 | Bassett | 711/111 |
|---|---|---|---|---|
| 7,120,743 | B2 * | 10/2006 | Meyer et al. | 711/118 |
| 7,412,574 | B2 * | 8/2008 | Jeddeloh | 711/158 |
| 7,512,762 | B2 * | 3/2009 | Gower et al. | 711/167 |
| 7,533,218 | B2 * | 5/2009 | Cypher | 711/115 |
| 7,966,443 | B2 * | 6/2011 | Grundy et al. | 711/5 |
| 2004/0024948 | A1 | 2/2004 | Winkler et al. | |
| 2004/0139286 | A1 | 7/2004 | Lin et al. | |
| 2005/0086441 | A1 | 4/2005 | Meyer et al. | |
| 2005/0149774 | A1 | 7/2005 | Jeddeloh et al. | |
| 2005/0177677 | A1 | 8/2005 | Jeddeloh | |
| 2006/0095701 | A1 | 5/2006 | Gower et al. | |
| 2006/0179262 | A1 | 8/2006 | Brittain et al. | |

* cited by examiner

*Primary Examiner* — Tammara Peyton

(57) ABSTRACT

Methods for controlling read data buffering are disclosed. In one of the methods core operations are performed in response to a receipt of a read command from a master controller and an internal or external communication buffer of a data storage node is selected to forward information to the master controller. The data storage node is selected based upon constraints and contents of one or more communication buffers. Information is forwarded from the selected internal or external communication buffer to the master controller.

20 Claims, 9 Drawing Sheets

SYSTEM AND METHOD FOR READ DATA BUFFERING WHEREIN AN ARBITRATION POLICY DETERMINES WHETHER INTERNAL OR EXTERNAL BUFFERS ARE GIVEN PREFERENCE

RELATED U.S. APPLICATIONS

This application claims benefit of and priority to U.S. provisional patent application Ser. No. 61/004,361, filed on Nov. 26, 2007, entitled SYSTEMS AND METHODS FOR READ DATA BUFFERING, which is hereby incorporated by reference into this specification in its entirety, U.S. provisional patent application Ser. No. 61/004,434, filed on Nov. 26, 2007, entitled A STORAGE SYSTEM AND METHOD, which is hereby incorporated by reference into this specification in its entirety, U.S. provisional patent application Ser. No. 61/004,362, filed on Nov. 26, 2007, entitled A SYSTEM AND METHOD FOR ACCESSING MEMORY, which is hereby incorporated by reference into this specification in its entirety and U.S. provisional patent application Ser. No. 61/004,412, filed on Nov. 26, 2007, entitled A METHOD FOR SETTING PARAMETERS AND DETERMINING LATENCY IN A CHAINED DEVICE SYSTEM, which is hereby incorporated by reference into this specification in its entirety.

This application is related to U.S. patent application Ser. No. 12/276,143, filed on Nov. 21, 2008, entitled A STORAGE SYSTEM AND METHOD, which is hereby incorporated by reference into this specification in its entirety, U.S. patent application Ser. No. 12/267,010, filed on Nov. 21, 2008, entitled A SYSTEM AND METHOD FOR ACCESSING MEMORY, which is hereby incorporated by reference into this specification in its entirety and U.S. patent application Ser. No. 12/267,061, filed on Nov. 21, 2008, entitled A METHOD FOR SETTING PARAMETERS AND DETERMINING LATENCY IN A CHAINED DEVICE SYSTEM, which is hereby incorporated by reference into this specification in its entirety.

FIELD OF THE INVENTION

The present invention relates to the field of data storage node management. More particularly, the present invention relates to an efficient and effective system and method for accessing memory node resources.

BACKGROUND

Electronic systems and circuits have made a significant contribution towards the advancement of modern society and are utilized in a number of applications to achieve advantageous results. Electronic technologies such as digital computers, calculators, audio devices, video equipment, and telephone systems have facilitated increased productivity and reduced costs in analyzing and communicating data, ideas and trends in most areas of business, science, education and entertainment. Frequently, the electronic systems designed to provide these results include memories. However, accessing memory resources in a fast and efficient manner can involve complicated protocols.

Numerous electronic devices include processors that operate by executing software comprising a series of instructions for manipulating data in the performance of useful tasks. The instructions and associated data are typically stored in a memory. Memories usually consist of a location for storing information and a unique indicator or address. The utility a device provides often depends upon the speed and efficiency at which instructions are executed. The ability to access a memory and transfer information quickly and conveniently usually has a significant impact on information processing latency. The configuration of a memory usually affects the speed at which memory locations are accessed.

In typical daisy chained memory (data storage) networks, latency and effective bandwidth are dependent on buffer size within the individual data storage devices. If smaller buffer sizes are employed, latency will be smaller, but bandwidth is degraded. On the other hand, if larger buffer sizes are employed, bandwidth is improved but latency becomes larger. Thus, it is very difficult to shorten the latency and at the same time improve bandwidth within a typical daisy chained data storage system.

SUMMARY OF THE INVENTION

Systems and methods for controlling buffering are disclosed. In one of the methods core operations are performed in response to a receipt of a read command from a master controller and a communication buffer of a data storage node is selected to forward information to the master controller. The data storage node is selected based upon constraints and contents of one or more communication buffers. Information is forwarded from the selected communication buffer to the master controller.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION OF THE INVENTION

The present invention will now be described in detail with reference to a various embodiments thereof as illustrated in the accompanying drawings. In the following description, specific details are set forth in order to provide a thorough understanding of the present invention. It will be apparent, however, to one skilled in the art, that the present invention may be practiced without using some of the implementation details set forth herein. It should also be understood that well known operations have not been described in detail in order to not unnecessarily obscure the present invention.

Figure 1:
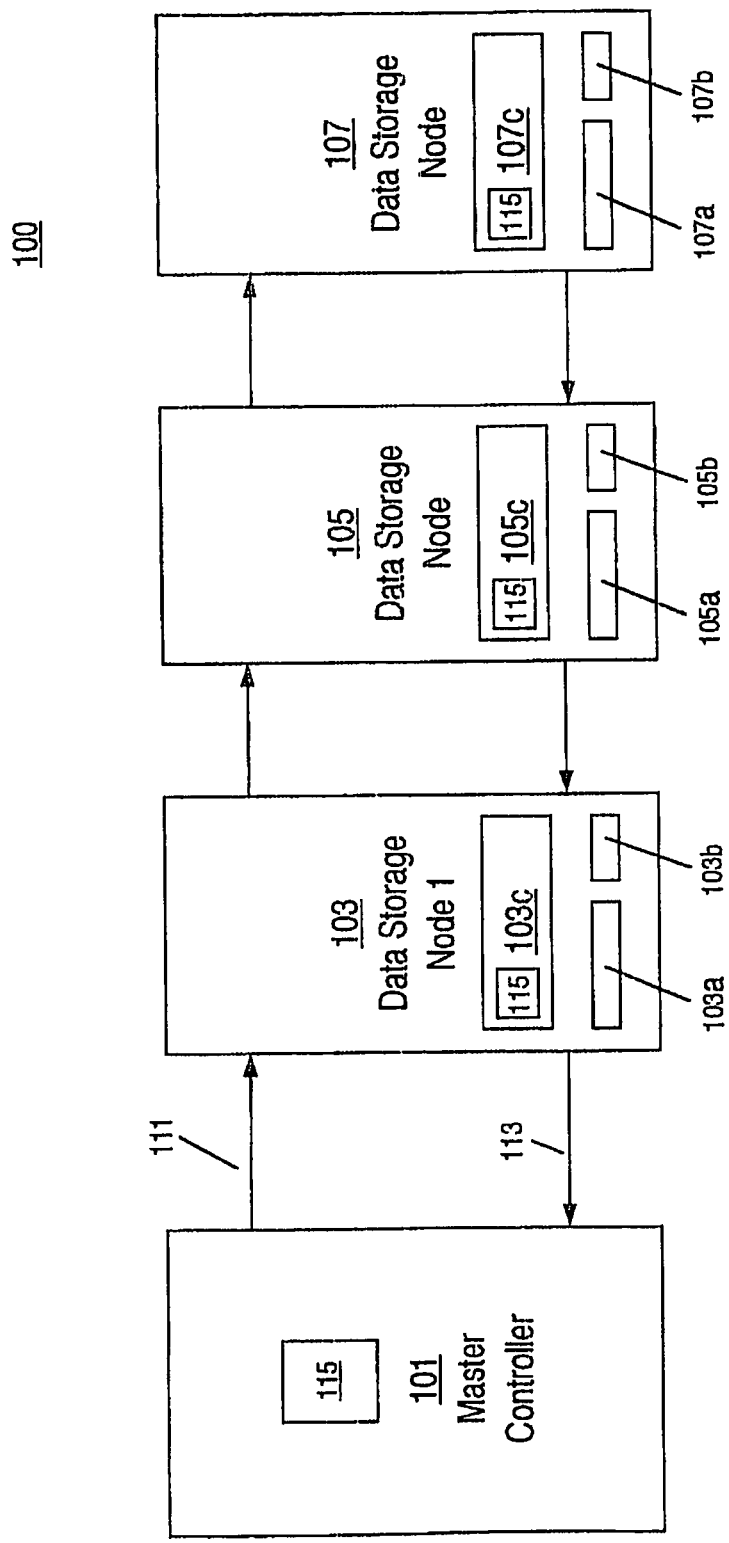
FIG. 1 is a block diagram data storage system that includes a system for controlling read data buffering according to one embodiment of the present invention.

Exemplary Data Storage System and System for Controlling Read Data Buffering According to One Embodiment FIG. 1 shows a data storage system 100 that includes a system 115 for controlling read data buffering according to one embodiment of the present invention. In one embodiment, system 115 implements an algorithm that operates to shorten latency and improve effective bandwidth of data storage system 100. In one embodiment, data storage nodes are disclosed that include internal and external communication buffers. In one exemplary implementation communication buffers include internal read data buffers and external read data buffers. For example, FIG. 1 shows master controller 101, data storage node 103, data storage node 105, data storage node 107, read communication 111 (read command), read response 113 and system 115. In the FIG. 1 embodiment, data storage nodes 103, 105 and 107 include internal read data buffers 103a, 105a and 107a respectively, external read data buffers 103b, 105b and 107b respectively and internal controllers 103c, 105c and 107c respectively.

Referring to FIG. 1, master controller 101 controls read and write commands to data storage nodes 103, 105 and 107. In one embodiment, read commands 111 can be adjusted such that the flow of data to master controller 101 is controlled. Moreover, in one embodiment, read responses 113 can be forwarded to master controller 101 in a manner such that when space is available between read responses 113 forwarded from internal read data buffer 103a of data storage node 103 to master controller 101, read data responses from an external read data buffer 103b of data storage node 103 can be opportunistically squeezed into the space and forwarded to master controller 101 (see discussion made with reference to FIG. 2 and also the discussion of the operation of system 115 below).

Data storage nodes 103, 105 and 107 are coupled to master controller 101 in a daisy chain arrangement. In one embodiment, as mentioned above, data storage nodes 103, 105 and 107 comprise internal and external read data buffers 103a-107a and 103b-107b respectively. In one embodiment, internal and external read data buffers 103a-107a and 103b-107b buffer data that is to be forwarded to master controller 101 in response to read communications 111 that are issued from master controller 101. In one embodiment, various algorithms can be employed to determine priority for purposes of forwarding data held in internal read data buffers 103a-107a and external read data 103b-107b to master controller 101.

Internal controllers 103c, 105c and 107c control operations such as the forwarding of data from respective data storage nodes to master controller 101, and the execution of internal reads of respective data storage nodes. In one embodiment, components and operations of system 115 can be associated with and support components and operations of internal controllers 103c, 105c and 107c. In one embodiment, these components and operations can implement various algorithms and operate cooperatively with the components and operations of internal controllers 103c, 105c and 107c to determine priority as it regards the forwarding of data to master controller 101. These algorithms are discussed in detail herein (e.g., see exemplary algorithms in FIGS. 6 and 7).

System 115 acts cooperatively with components and operations of master controller 101 to control read data buffering by directing the issuance of reads based on the latency associated with particular read operations. In addition, as discussed above, components and operations of system 115 act cooperatively with components and operations of internal controllers 103-107c to control the flow of information from data storage nodes 103, 105 and 107 to master controller 101. In one embodiment, some components and operations of system 115 can be integrated with master controller 101 and other components and operations of system 115 can be integrated with internal controllers 103c-107c. See FIG. 1 which shows some components of system 115 located in master controller 101 and some components of system 115 located in internal controllers 103c-107c. In another embodiment, components and operations of system 115 can be separate from components and operations of master controller 101 and internal controller 103c-107c, but operate cooperatively therewith.

In one embodiment, system 115 determines whether an internal read data buffer 103a-107a or an external read data buffer 103b-107b of one of the data storage nodes 103, 105 and 107 is to send information to master controller 101. In one embodiment, the determination is based on various algorithms. More specifically, in one embodiment, the determination is based upon constraints and contents of the read data buffers. And, in addition, in one embodiment, system 115 can direct that a burst of data from external read data buffer 103b be squeezed into a space between data transmissions to master controller 101 from an internal read data buffer 103a. An exemplary operation of system 115 is discussed in detail below in the following section.

Figure 2:
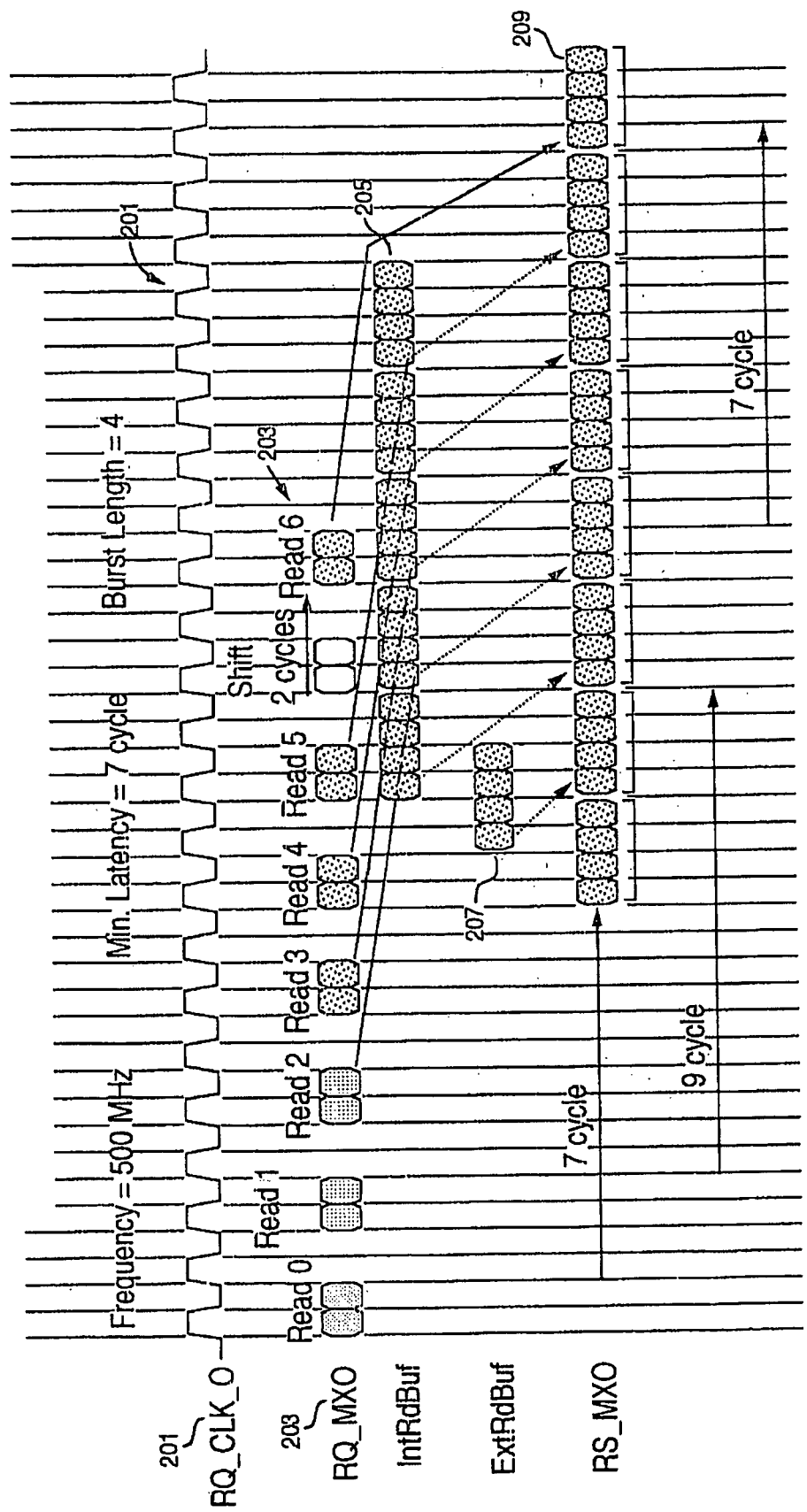
FIG. 2 is a graph that illustrates the operation of a data storage system according to one embodiment of the present invention.

Exemplary Operation of System for Controlling Read Data Buffering According to One Embodiment Data Forwarded to Master Controller and Adjustment of Read Operations FIG. 2 is a graph that illustrates an example of the affect that system 115 has on the forwarding of data to master controller 101 and on read operations that are executed by master controller 101 according to one embodiment of the present invention. It should be appreciated that, the discussion of FIG. 2 below makes reference to relevant elements of FIG. 1. FIG. 2 shows graphical representations for clock signal 201, read commands 203, internal read buffer data 205, external read buffer data 207, read data 209. In the FIG. 2 example, seven read operations read0-read6, with latencies ranging from 7 to 9 cycles, are shown.

Referring to FIG. 2, the first read operation, read0 involves seven cycles of latency and the second read operation read1 involves nine cycles of latency. In one embodiment, because of the time shift created as a result of the difference in the latencies of the first and second read operations, system 115 can cause a burst of external read buffer data 207 to be forwarded to master controller 101 between bursts of internal read buffer data 205 that are forwarded to master controller 101 (e.g., a burst of external read buffer data 207 is placed between bursts of internal read buffer data 205 that is sent to master controller 101).

Referring again to FIG. 2, after read1, the next five read operations involve nine cycles of latency, before the issuance of read operation read6 which involves seven cycles of latency. As shown in FIG. 2, in order to maintain an optimal flow of data to master controller 101, system 115 can cause the issuance of read operation read6 to be shifted by two cycles.

Affect on Operation of Internal Controllers

Referring again to FIG. 1, as discussed above, in one embodiment components and operations of system 115 can implement various algorithms that act cooperatively with components and operations of internal controllers 103c, 105c and 107c under certain conditions. These algorithms are discussed in detail below and with reference to FIGS. 6 and 7. In one embodiment, a round robin algorithm may be implemented that chooses between local data (read responses) coming from data storage node 103 and data that is coming from downstream devices (data storage node 105 and data storage node 107). In this manner a fair arbitration policy ensures that no device is starved for a prolonged period of time. A simple one bit counter (e.g., called RNDRBN) may be used to indicate whether local data packets (e.g., RNDRBN "1") or downstream data packets (e.g., RNDRBN "0") are given preference to send data to the master controller 101. These algorithms are discussed below. In the first of such algorithms:

If RNDRBN="1", the following rules apply in the following order:

1. If data exists in internal read buffer 103a, the data that exists in internal read buffer 103a is sent to master controller 101 in a first in first out (FIFO). If an internal read of data storage device 103 reveals additional data is ready to be sent to controller 101, this data is stored in internal read buffer 103a of data storage device 103 at the next available entry. If data storage device 105 is simultaneously sending data to data storage device 103, this data is stored in external read buffer 103b of data storage device 103 at the next available entry. RNDRBN is set to "0".

2. If no data exists in internal read buffer 103a and an internal read of data storage device 103 identifies data that is ready to be sent to master controller 101, the data that is ready to be sent to master controller 101 is forwarded to master controller 101. If data storage device 105 is simultaneously sending data to data storage device 105, this data is stored in external read buffer 103b of data storage device 103 at the next available entry. RNDRBN is set to "0".

3. If no data exists in internal read buffer 103a and an internal read of data storage device 103 identifies data that is ready to be sent to master controller 101 and data exists in external read buffer 103b of data storage node 103 the data that is ready to be sent to master controller 101 is sent to master controller 101 in a first in first out (FIFO) manner to master controller 101. If data storage node 105 is simultaneously sending data to data storage node 103 this data is stored in external read buffer 103b of data storage node 103 at the next available entry. RNDRBN is set to "1".

4. If no data exists in internal read buffer 103a and no data is ready to be sent to master controller 101 by an internal read of data storage device 103 and no data exists in external read buffer 103b of data storage device 103 and data storage device 105 is simultaneously sending data to data storage device 103, the data that data storage device 105 is sending to data storage device 103 is forwarded to master controller 101. RNDRBN is set to "1".

5. If none of the above conditions are satisfied, RNDRBN remains a "1".

In a second algorithm where priority is given to an external read data buffer:

If RNDRBN "0", the following rules apply in the following order:

1. If data exists in the external read buffer 103b, the data that exists in the external read buffer 103b is sent to the controller in a first in first out (FIFO) manner to master controller 101. If data storage device 103 also has data that is ready to be sent to master controller 101 by an internal read of data storage device 103, the data that is ready to be sent to master controller 101 is stored in internal read buffer 103a of 103 at the next available entry. If data storage device 105 is simultaneously sending data to data storage device 103, the data that data storage device 105 is sending to data storage device 103 is stored in external read buffer 103b of data storage device 103 at the next available entry. RNDRBN is set to "1".

2. If no data exists in external read buffer 103b and data storage device 103a is sending data to data storage device 103a, the data that data storage device 103a is sending to data storage device 103a is forwarded to master controller 101. If data storage device 103 also has data that is ready to be sent to master controller 101 by an internal read of data storage device 103, the data that is ready to be sent to master controller 101 is stored in the internal read buffer 103a of data storage device 103 at the next available entry. RNDRBN is set to "1".

3. If no data exists in external read buffer 103b and data storage device 103 is not sending data to data storage device 103, and data exists in internal read buffer 103a of data storage device 103, the data that exists in internal read buffer 103a of data storage device 103 is sent to master controller 101 in a first in first out (FIFO) manner to master controller 101. If data storage device 103 also has data that is ready to be sent to master controller 101 that is identified by an internal read of data storage device 103, the data that is identified by an internal read of data storage device 103 is stored in the internal read buffer 103a of data storage device 103 at the next available entry. RNDRBN is set to "0".

4. If no data exists in external read buffer 103b and data storage device 103 is not sending data to data storage device 103 and no data exists in internal read buffer 103a of data storage device 103 and data is ready to be sent to controller 101 by an internal read of data storage device 103 the data that is ready to be sent to controller 101 is forwarded to controller 101. RNDRBN is set to "0". 5. If none of the above conditions are satisfied, RNDRBN remains a "0".

In other embodiments, in addition to the algorithms discussed above, an algorithm that selects external traffic over internal traffic in a static decision and prioritizes data from further data storage nodes over data from nearer data storage nodes can be employed.

Figure 3:
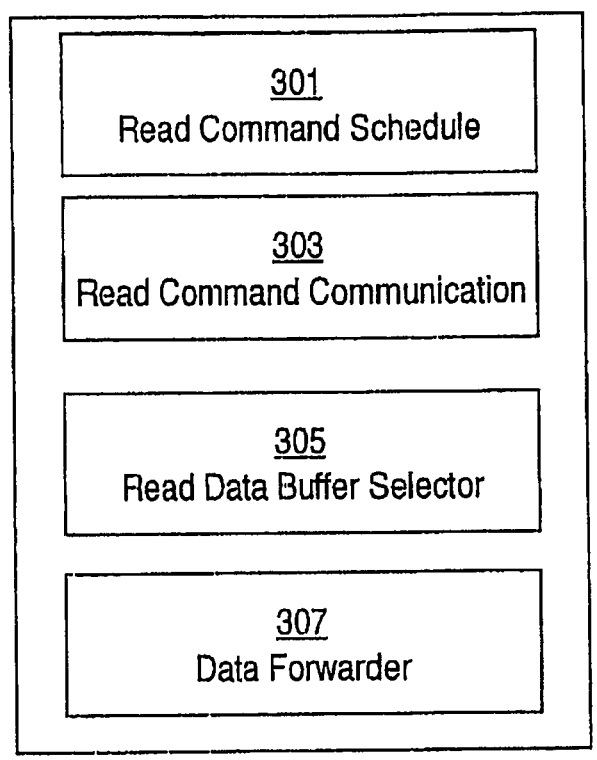
FIG. 3 is a block diagram for controlling read data buffering according to one embodiment of the present invention.

Components of System for Controlling Read Data Buffering According to One Embodiment FIG. 3 shows components of a system 115 for controlling read data buffering according to one embodiment of the present invention. In one embodiment, system 115 implements an algorithm for read data buffering based on various algorithms. In the FIG. 3 embodiment, system 115 includes read command scheduler 301, read command communicator 303, read data buffer selector 305, and data forwarder 307.

It should be appreciated that aforementioned components of system 115 can be implemented in hardware or software or in a combination of both. In one embodiment, components and operations of system 115 can be encompassed by components and operations of one or more computer programs (e.g., program of master controller or data storage nodes such as their internal controllers). In another embodiment, components and operations of system 115 can be separate from the aforementioned one or more computer programs but can operate cooperatively with components and operations thereof.

Referring to FIG. 3, read command scheduler 301 schedules the timing of the issuance of read commands to a plurality of daisy chained data storage nodes (e.g., 103-107 in FIG. 1). In one embodiment, the aforementioned scheduling of the timing of the issuance of read commands to data storage nodes can include adjusting a read command to be executed earlier or later based upon a determined latency of the read command.

Read command communicator 303 communicates or directs the communication of read commands to the plurality of daisy chained storage nodes (e.g., 103-107 in FIG. 1). In one embodiment, read command communicator 303 directs the communication of read commands based on the timing determined by read command scheduler 301.

Read data buffer selector 305 determines the internal or external read data buffer of one of the plurality of daisy chained storage nodes, that is to forward data to the data storage system master controller (e.g., 101 in FIG. 1). In one embodiment, the determination is based upon communication buffer constraints and contents. In one embodiment, an algorithm can be used to determine what data is to be forwarded to the master controller (see discussions made with reference to FIGS. 5 and 6). In one embodiment, under certain circumstances, read data buffer selector 305 can direct that a burst of data from an external read data buffer of a storage node be squeezed into a space between data transmissions to master controller (e.g., 101 in FIG. 1) from an internal read data buffer of a storage node (e.g., 103 in FIG. 1) in order to optimize the flow of data to master controller (reduce latency).

Data forwarder 307 forwards or directs the forwarding of data from an internal or external communication buffer of a data storage node to the master controller (e.g., 101 in FIG. 1). In one embodiment, data forwarder 307 forwards data that is selected to be forwarded by read data buffer selector 305.

Method for Controlling Read Data Buffering According to One Embodiment

Figure 4A:
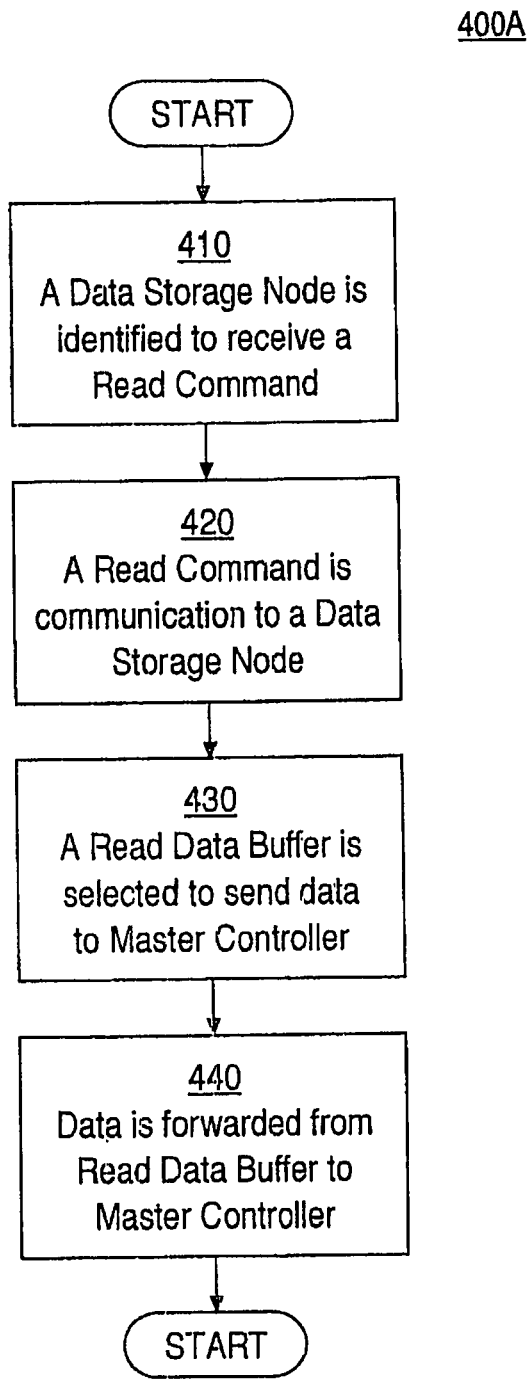
FIG. 4A shows a flowchart of an exemplary method for controlling read data buffering according to one embodiment of the present invention.

FIG. 4A shows a flowchart 400A of the steps performed in a method for controlling read data buffering according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 4A, at step 410, the timing of the forwarding of read commands to an identified data storage node is determined. In one embodiment, a read command scheduler (e.g., 301 in FIG. 3) can be used to determine the timing of the forwarding of read commands to data storage nodes. In one embodiment, the timing of the forwarding of read commands can be based on the latency that is associated with read operations to the identified data storage node. In one embodiment, determining the timing of the forwarding of read commands to data storage nodes can include adjusting a read command to be executed earlier or later based upon the determined latency.

At step 420 a read command is sent to one of a plurality of daisy chained storage nodes. In one embodiment, a read command communicator (e.g., 303 in FIG. 3) can be used to direct the communication of the read command to data storage nodes.

At step 430, a read data buffer is selected to send information to the master controller (e.g., 101 in FIG. 1). In one embodiment, a read data buffer selector (e.g., 305 in FIG. 3) can be used to determine which of the internal or external read data buffers, of one of the plurality of daisy chained data storage nodes, is to send information to the master controller (e.g., 101 in FIG. 1). In one embodiment, the determination may be based upon internal and external read data buffer constraints and contents. In one embodiment, an algorithm can be used to determine what data is to be forwarded to the master controller (see discussions made with reference to FIGS. 5 and 6).

At step 440, information is forwarded to the master controller from the selected read data buffer. In one embodiment, a data forwarder (e.g., 307 in FIG. 3) can be used to forward data that is selected to be forwarded by the read data buffer selector (e.g., 305 in FIG. 3).

Figure 4B:
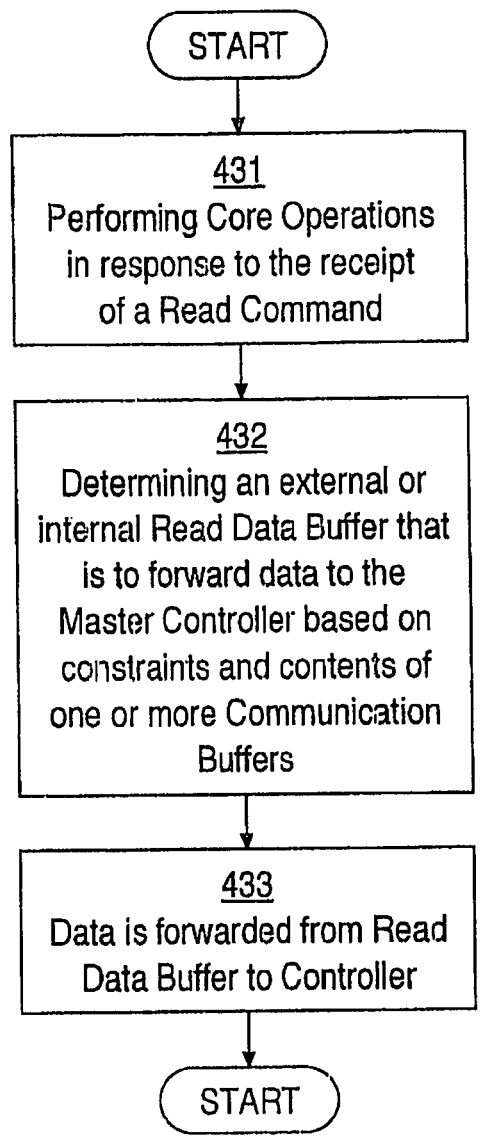
FIG. 4B shows a flowchart of an exemplary method for selecting a read data buffer on which to send information to the master controller according to one embodiment of the present invention.

FIG. 4B shows a flowchart 400B of the steps performed in a method for selecting a read data buffer to forward data to the master controller such as is performed at step 430 of the method discussed with reference to FIG. 4A according to one embodiment. Referring to FIG. 4B, at step 431 core operations in support of a read command received from the master controller are performed. At step 432, in response to the receipt of said read command, a read data buffer is selected from which to forward data to the master controller. In one embodiment, at step 432, it is determined which of either an internal or external communication buffer is to forward information to the master controller. In one embodiment, the selection of the internal or external communication buffer is based upon constraints and contents of one or more communication buffers of one or more data storage nodes. In one embodiment, the selection is based upon an algorithm such as that discussed below with reference to FIG. 5 that takes such constraints and contents into account. In another embodiment, the selection is based upon an algorithm such as that discussed below with reference to FIG. 6. At step 432 the data from the read data buffer selected at step 433 is forwarded to the master controller.

Figure 5:
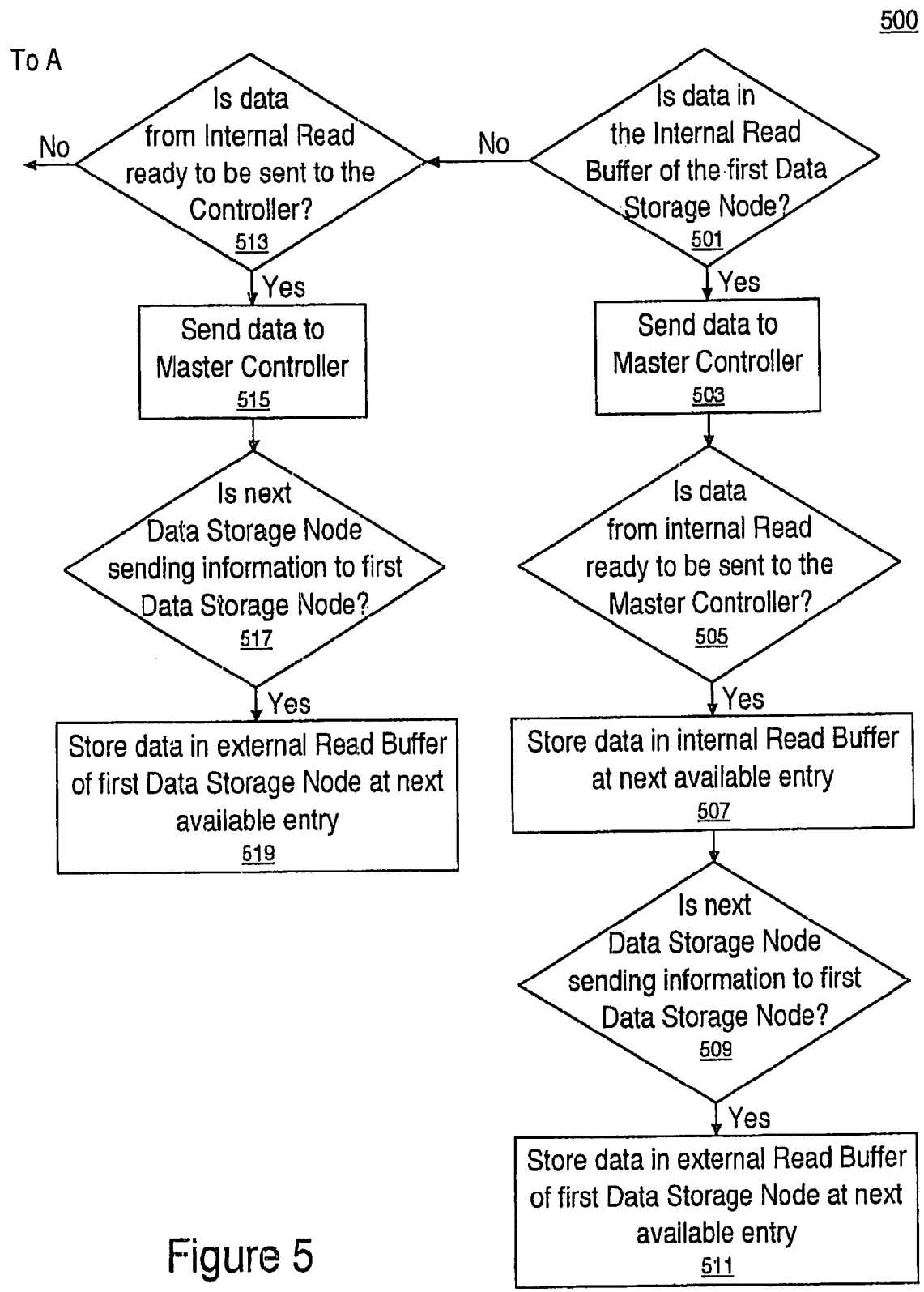
FIG. 5 shows a flowchart of an exemplary method for operating an internal controller of data storage node according to one embodiment of the present invention.
Figure 5:
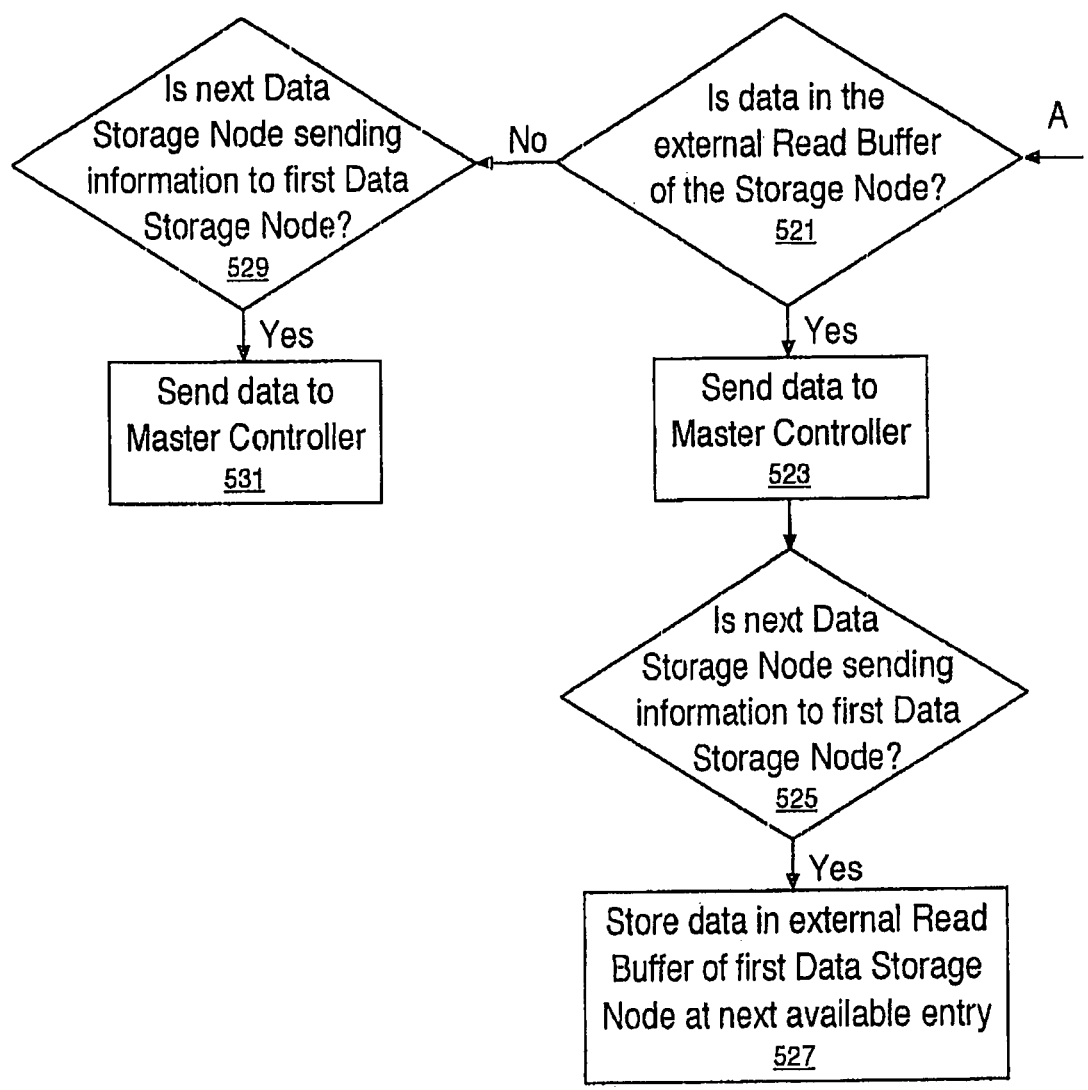

FIG. 5 shows a flowchart 500 of the steps performed in a method for operating an internal controller of data storage node 103 of FIG. 1 in accordance with an algorithm implemented by system 115 according to one embodiment of the present invention. In the following descriptions of FIG. 5, reference is made to relevant elements of FIG. 1 (e.g., master controller 101 and data storage nodes 103 and 105).

Referring to FIG. 5, at 501 it is determined whether or not data exists in the internal read buffer (e.g., 103a) of data storage node 103. If data exists in data storage node 103, then data is sent at 503 to master controller 101 in a First-In-First-Out (FIFO) manner. At 505 if it is determined that data storage node 103 has data that is ready to be sent to master controller 101 by an internal read of data storage node 103, data is stored at 507 in the internal read buffer (e.g., 103a) of data storage node 103 at the next available entry. If it is determined at 509 that the adjacent data storage node 105 is sending data to data storage node 103, this data is stored in the external read buffer (e.g., 103b) of data storage node 103 at the next available entry at 511.

If it is determined at 501 that no data exists in the internal read buffer (e.g., 103a) of data storage node 103 and it is determined at 513 that data is ready to be sent to master controller 101 by an internal read of data storage node 103, then data is forwarded to master controller 101 at 515. If it is determined at 517 that data storage node 105 is also sending data to data storage node 103, then this data is stored in the external read buffer (e.g., 103b) of data storage node 103 at the next available entry at 519.

If it is determined at 501 and 513 respectively that no data exists in the internal read buffer (e.g., 103a) of data storage node 103 and that no data is ready to be sent to master controller 101 by an internal read of data storage node 103, and it is determined at 521 that data exists in the external read buffer (e.g., 103b) of data storage node 103, then this data is sent to master controller 101 in a First-In-First-Out manner at 523. If it is determined at 525 that data storage node 105 is also sending data to data storage node 103, the data that is being sent is stored in the external read buffer (e.g., 103b) of data storage node 103 at the next available entry at 527.

If it is determined at 501, 513 and 521 respectively that no data exists in the internal read data buffer of data storage node 103, that no data is ready to be sent to master controller 101 by an internal read of data storage node 103 and that no data exists in the external read buffer (e.g., 103b) of data storage node 103, and it is determined at 529 that data storage node 105 is also sending data to data storage node 103, this data is forwarded to master controller 101 at 531.

Figure 6:
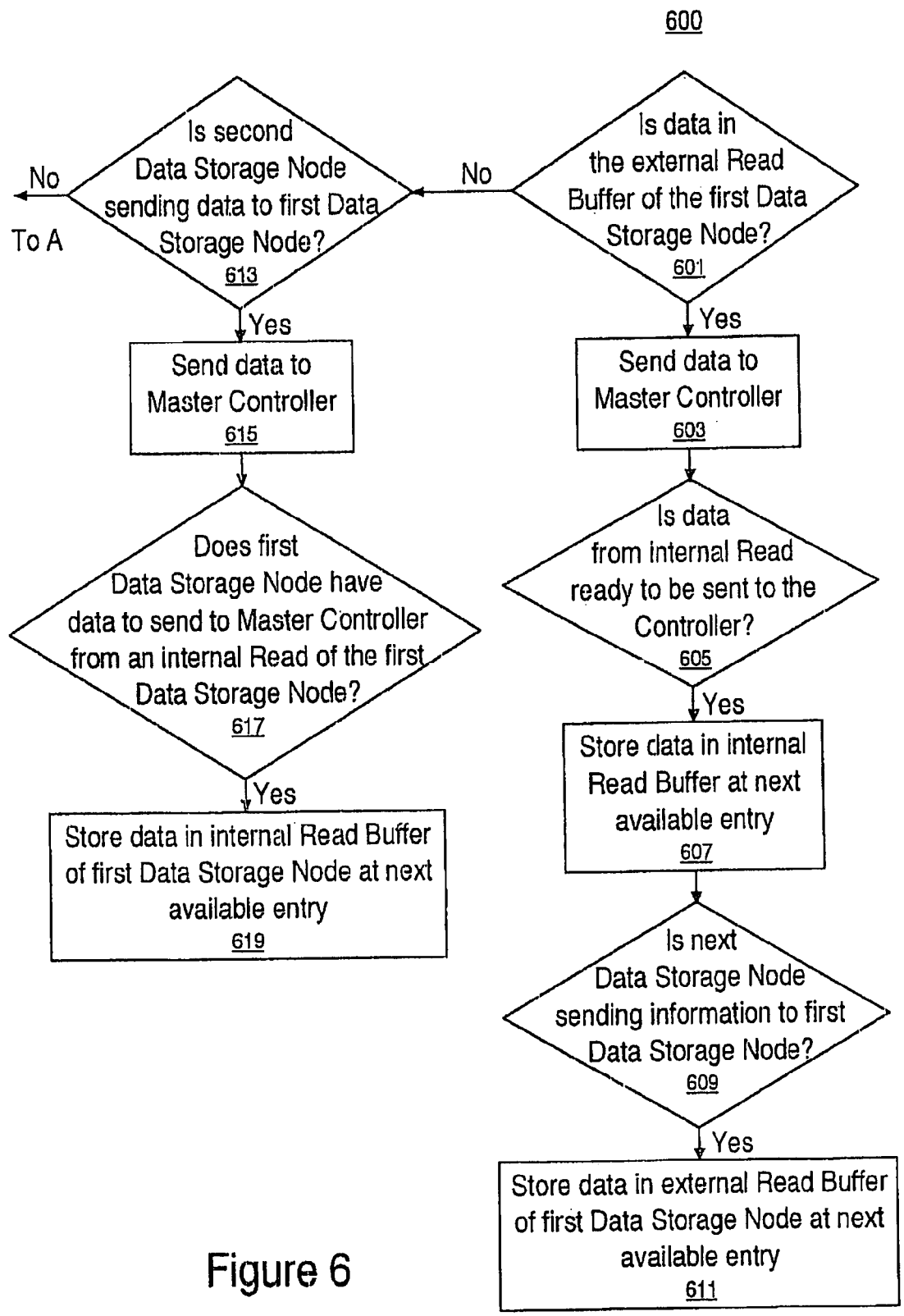
FIG. 6 shows a flowchart of an exemplary method for operating an internal controller of data storage node according to one embodiment of the present invention.
Figure 6:
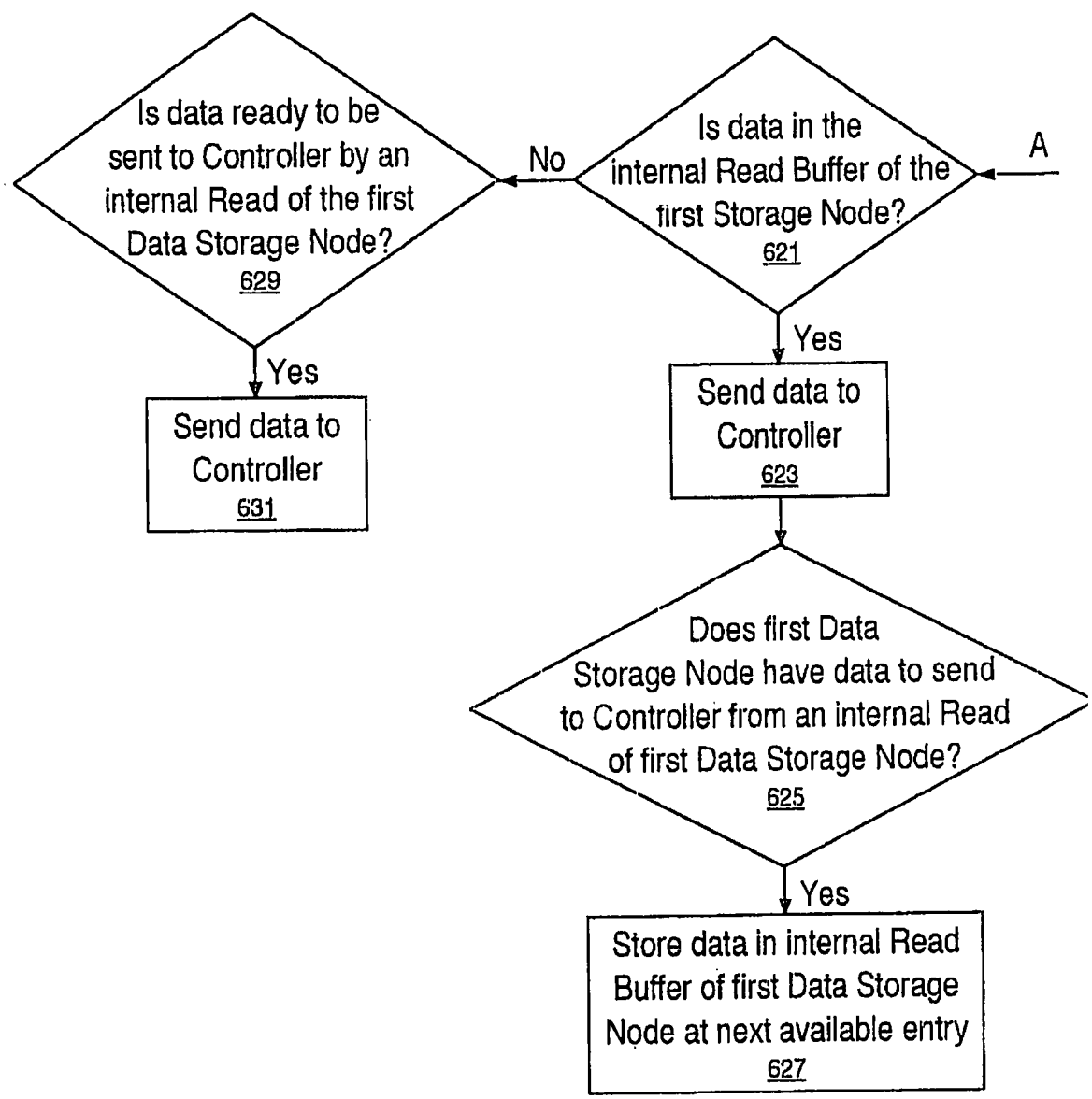

FIG. 6 shows a flowchart 600 of the steps performed in a method for operating an internal controller of data storage node 103 of FIG. 1 in accordance with another algorithm implemented by system 115 according to one embodiment of the present invention. In the following descriptions of FIG. 6, reference is made to relevant elements of FIG. 1 (e.g., master controller 101 and data storage nodes 103 and 105).

Referring to FIG. 6, at 601 it is determined whether data exists in an external read buffer (e.g., 103b) of data storage node 103. If data exists in an external read buffer (e.g., 103b) of data storage node 103, then data is sent at 603 to master controller 101 in a First-In-First-Out (FIFO) manner. At 605 it is determined if data from an internal read of data storage node 103 is ready to be sent to master controller 101, if so, this data is stored at 607 in the internal read buffer (e.g., 103a) of data storage node 103 at the next available entry. If it is determined at 609 that adjacent data storage node 105 is sending data to data storage node 103, this data is stored in the external read buffer (e.g., 103b) of data storage node 103 at the next available entry at 611.

If it is determined at 601 that no data exists in the external read buffer (e.g., 103b) and it is determined at 613 that data storage node 103 is sending data to data storage node 103, this data is forwarded to master controller 101 at 615. If it is determined at 617 that data storage node 103 has data ready to send to master controller 101 by an internal read of data storage node 103 then this data is stored at 619 in the internal read buffer (e.g., 103a) of data storage node 103 at the next available entry.

If it is determined at 601 and 613 respectively that no data exists in the external read buffer (e.g., 103b) of data storage node 103 and that data storage node 103 is not sending data to data storage node 103, and it is determined at 621 that data exists in the internal read buffer (e.g., 103a) of data storage node 103, then this data is sent to master controller 101 in a First In First Out manner at 623. If it is determined at 625 that data storage node 103 has data that is ready to be sent to master controller 101 by an internal read of data storage node 103, this data is stored in the internal read buffer (e.g., 103a) of data storage node 103 at the next available entry at 627.

If it is determined at 601, 613 and 621 respectively that no data exists in the external read buffer (e.g., 103b) of data storage node 103, that data storage node 103 is not sending data to data storage node 103 and that data is not in the internal read buffer (e.g., 103a) of data storage node 103, and it is determined at 629 that data storage node 105 has data that is ready to be sent to master controller 101 by an internal read of data storage node 103, this data is forwarded to master controller 101 at 631.

In yet another embodiment, an algorithm that selects external traffic over internal traffic in a static decision and prioritizes data from further data storage nodes over data from data storage nodes that are nearer can be employed.

With reference to exemplary embodiments thereof, methods for controlling read data buffering are disclosed. In one of the methods core operations are performed in response to a receipt of a read command from a master controller and an internal or external communication buffer of a data storage node is selected to forward information to the master controller. The data storage node is selected based upon constraints and contents of one or more communication buffers. Information is forwarded from the selected internal or external communication buffer to the master controller.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for controlling read data buffering, comprising: performing core operations in response to a receipt of a read command from a master controller;
   determining whether an internal or external communication buffer of a data storage device of a plurality of data storage devices that are both located inside the physical structure of said data storage device is to forward information to said master controller, wherein said determining is based upon constraints and contents of one or more communication buffers of said plurality of data storage devices wherein said constraints comprise a priority designation that is given the internal and external communication buffer; and
   forwarding information from said internal or external communication buffer to said master controller wherein an arbitration policy determines whether the internal or external communication buffer is given preference to send information to said master controller.

2. The method of claim 1 wherein said forwarding information from said internal or external communication buffer comprises placing a burst of data from a data storage device located further away from said master controller than a data storage device located nearer said master controller between bursts of data sent to said master controller from said data storage device located nearer said master controller.

3. The method of claim 1 wherein said determining comprises determining if data exists in an internal communication buffer of a data storage device located nearest said master controller, and forwarding data to said master controller if it is determined that data exists in said internal communication buffer of said data storage device located nearest said master controller.

4. The method of claim 1 wherein said determining comprises determining if data is ready to be sent to said master controller by an internal read of a data storage device located nearest said master controller, and storing this data in an internal read buffer of said data storage device located nearest said master controller at the next available entry.

5. The method of claim 4 wherein said determining comprises determining if a data storage device located further away from said master controller than said data storage device that is located nearest said master controller is sending data to said data storage device located nearest said master controller, and storing this data in an external communication buffer of said data storage device located nearest said master controller at the next available entry, if it is determined that said data storage device located further away from said master controller than said data storage device located nearest said master controller is sending data to said data storage device located nearest said master controller.

6. The method of claim 1 wherein said determining comprises determining if data exists in an external communication buffer of a data storage device located nearest said master controller, and sending data to said master controller in a first in first out (FIFO) manner from said external communication buffer if it is determined that data exists in said external communication buffer of said data storage device located nearest said master controller.

7. The method of claim 1 wherein said determining is based on an algorithm that selects external traffic over internal traffic in a static decision and prioritizes data from farther data storage devices over data from data storage devices that are nearer.

8. A data storage system that includes data buffering control, comprising:
one or more data storage devices for storing information, wherein each of said one or more data storage devices includes external and internal communication buffers that are located inside of the physical structure of said one or more data storage devices; and
a master controller coupled to said one or more data storage devices for controlling a flow of information from said one or more data storage nodes to said master controller based upon constraints and contents of external and internal communication buffers of a data storage device that is coupled to said master controller wherein said constraints comprise a priority designation that is given the internal and external communication buffer, wherein based on said constraints and said contents, said external or said internal communication buffer located at a single one of said one or more data storage devices is selected to send information to said master controller forwarding information from said internal or external communication buffer to said master controller wherein an arbitration policy determines whether the internal or external communication buffer is given preference to send information to said master controller.

9. The storage system of claim 8 wherein said controlling said flow of information from said one or more data storage devices to said master controller comprises placing a burst of data from a data storage device located further away from said master controller than a data storage device located nearest said master controller between bursts of data sent to said controller from said data storage device that is located nearest to said master controller.

10. The storage system of claim 8 wherein said controlling said flow of information from said one or more data storage devices comprises adjusting the timing of an issuance of a read command to be executed earlier or later based upon a determined latency.

11. The storage system of claim 8 wherein said controlling said flow of information from said one or more data storage devices comprises determining if data exists in an internal communication buffer of a data storage device that is coupled nearest to said master controller, and sending data to said master controller if it is determined that data exists in said internal communication buffer of said storage device nearest to said master controller.

12. The storage system of claim 11 wherein said controlling said flow of information from said one or more data storage devices comprises determining if data is ready to be sent to said master controller by an internal read of a data storage device that is coupled nearest to said master controller, and storing this data in an internal communication buffer of said data storage device coupled nearest to said master controller at the next available entry.

13. The storage system of claim 12 wherein said controlling said flow of information from said one or more data storage devices comprises determining if a data storage device that is coupled further from said master controller is sending data to said data storage device that is coupled nearest to said master controller, and storing this data in an external communication buffer of said data storage device that is coupled nearest to said master controller at the next available entry, if it is determined that said data storage device that is coupled further from said master controller is sending data to said data storage device that is coupled nearest to said master controller.

14. The method of claim 8 wherein said controlling said flow of information from said one or more data storage devices comprises determining if data exists in an external communication buffer of said data storage device that is coupled nearest to said master controller, and sending data to said master controller in a first in first out (FIFO) manner if it is determined that data exists in said external communication buffer of said data storage device coupled nearest to said master controller.

15. The method of claim 8 wherein said controlling said flow of information is based on an algorithm that selects external data traffic over internal data traffic in a static decision and prioritizes data from data storage devices located further from said master controller over data from data storage devices that are located nearer said master controller.

16. A computer readable medium having computer-executable components comprising:
a read scheduling component for scheduling the timing of a read command sent from a master controller to one of one or more data storage devices;
a read command communicating component for communicating a read command to said one of said one or more data storage devices;
a read data buffer selection component for determining an internal or external communication buffer that are both located within the physical structure of a single one of said one or more data storage devices that is to send information to said controller based upon constraints and contents of one or more communication buffers of one or more of said one or more data storage devices wherein said constraints comprise a priority designation that is given the internal and external communication buffer; and
a data forwarding component for forwarding information from said internal or external communication buffer to said master controller wherein an arbitration policy determines whether the internal or external communication buffer is given preference to send information to said master controller.

17. The medium of claim 16 wherein said sending information from said internal or external communication buffer comprises placing a burst of data forwarded from a data storage device located further away from said master controller than a data storage device located nearer said master controller between bursts of data sent to said master controller from said data storage device located nearer said master controller.

18. The medium of claim 16 wherein said scheduling said timing of said read command comprises adjusting a read command to be executed earlier or later based upon a determined latency.

19. The method of claim 16 wherein said determining comprises determining if data exists in an internal communication buffer of a data storage device located nearest said master controller, and forwarding data to said controller if it is determined that data exists in said internal communication buffer of said device located nearest said master controller.

20. The method of claim 16 wherein said determining is based on an algorithm that selects external traffic over internal traffic in a static decision and prioritizes data from further data storage devices over data from data storage devices that are nearer.

* * * * *